Aug. 15, 1944. H. R. JARVIS 2,355,867
DETACHABLE FREIGHT CARRYING DEVICE
Filed Aug. 17, 1942 3 Sheets-Sheet 1
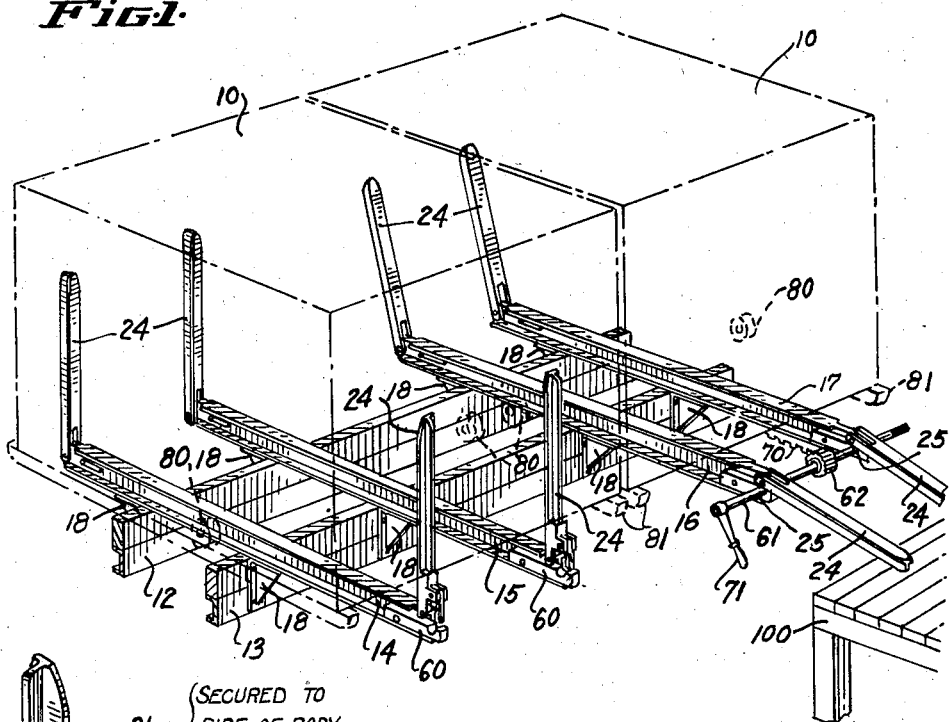
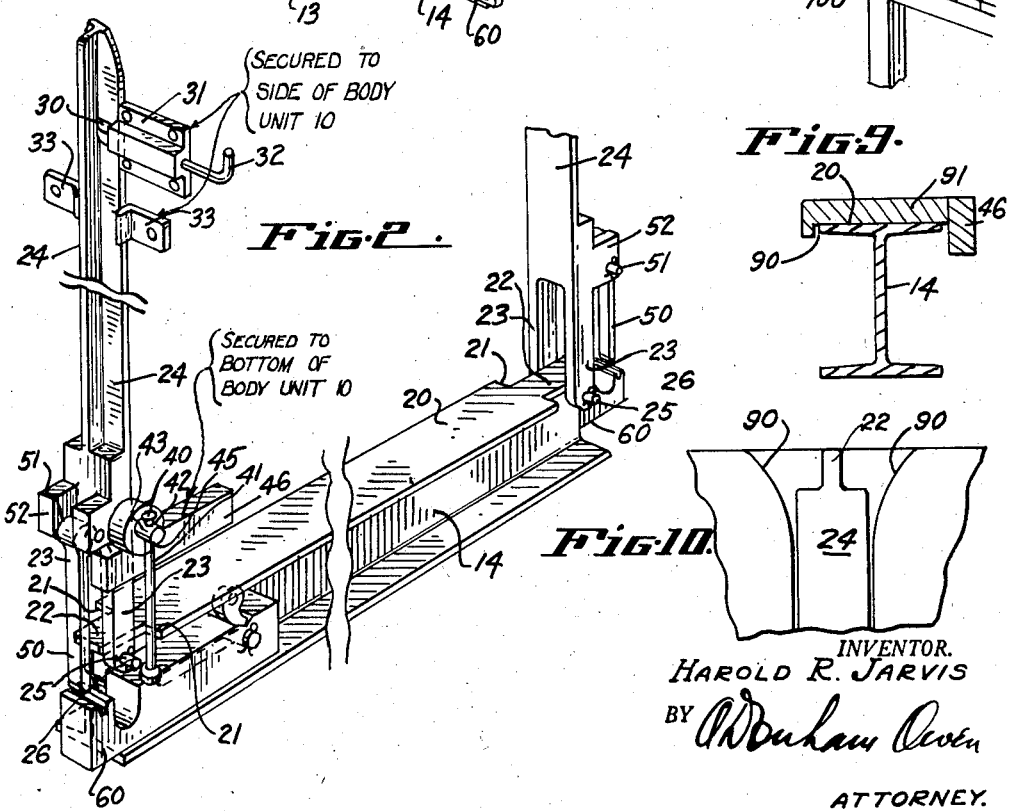
INVENTOR.
HAROLD R. JARVIS
BY
ATTORNEY.

Aug. 15, 1944.   H. R. JARVIS   2,355,867
DETACHABLE FREIGHT CARRYING DEVICE
Filed Aug. 17, 1942   3 Sheets-Sheet 2
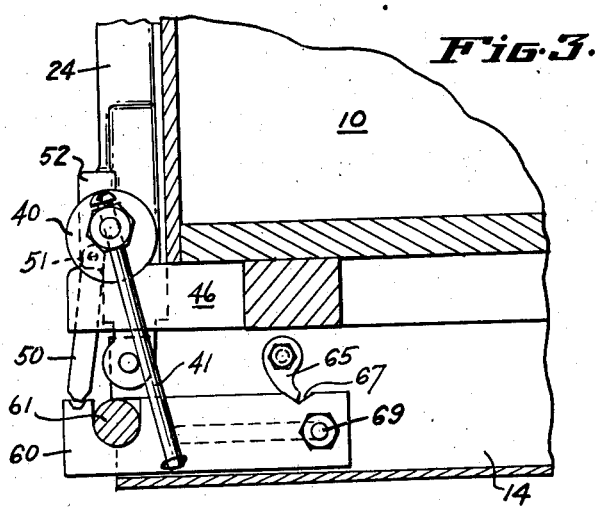
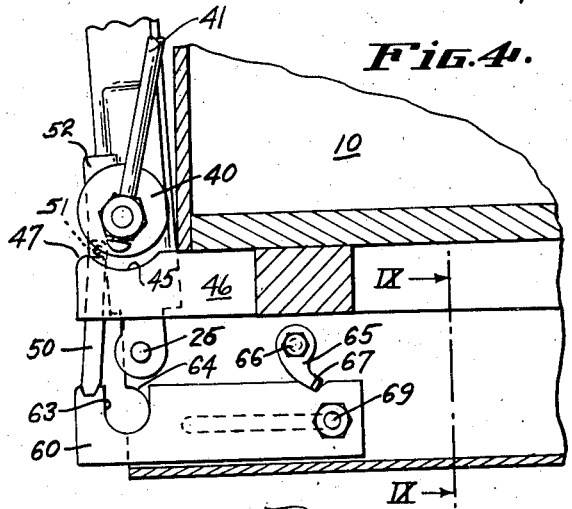
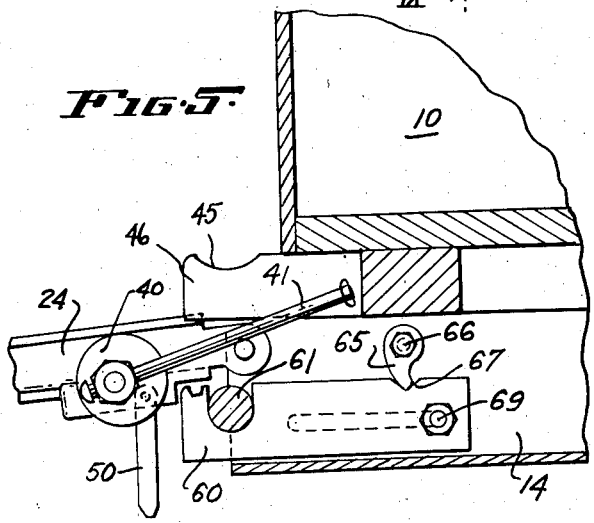
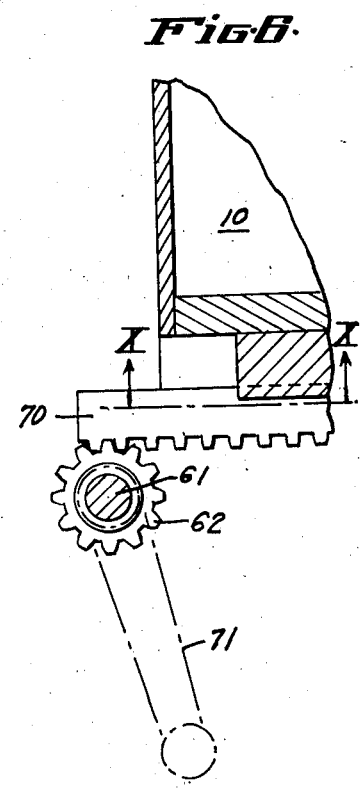
INVENTOR.
HAROLD R. JARVIS
BY
ATTORNEY.

Aug. 15, 1944.	H. R. JARVIS	2,355,867
DETACHABLE FREIGHT CARRYING DEVICE
Filed Aug. 17, 1942	3 Sheets-Sheet 3
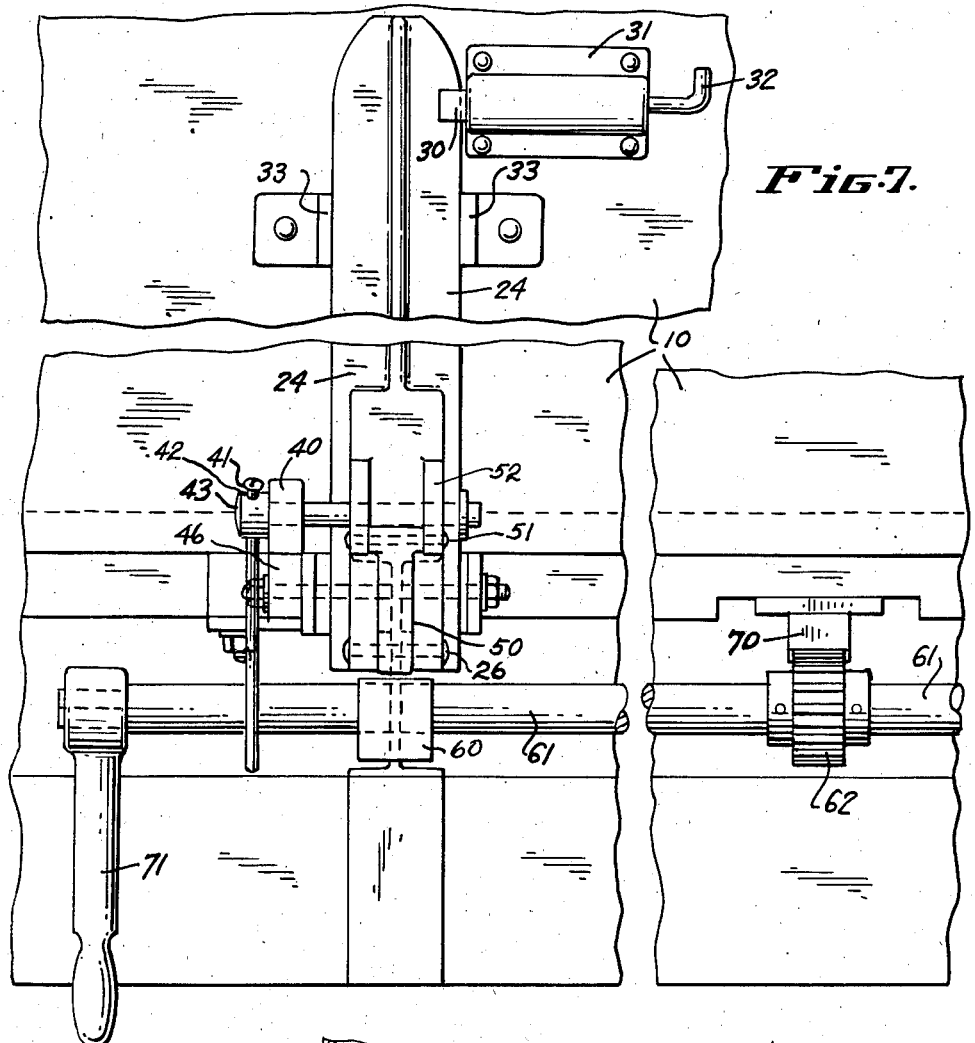
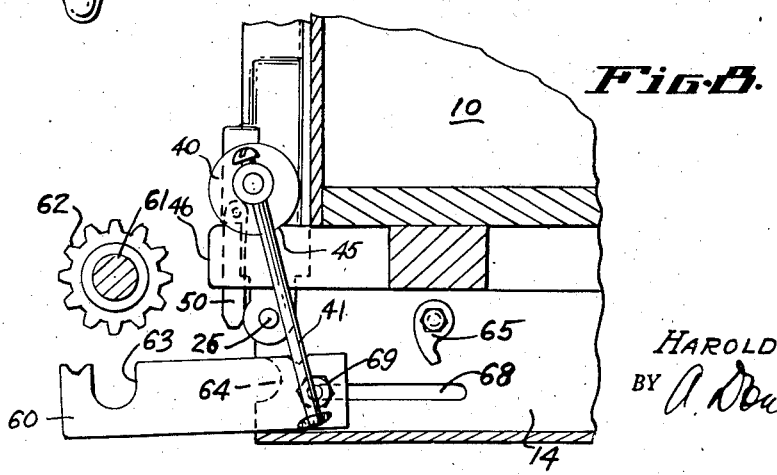
INVENTOR.
HAROLD R. JARVIS
BY
ATTORNEY.

Patented Aug. 15, 1944

2,355,867

UNITED STATES PATENT OFFICE 2,355,867

DETACHABLE FREIGHT CARRYING DEVICE

Harold R. Jarvis, San Francisco, Calif.

Application August 17, 1942, Serial No. 455,051

9 Claims. (Cl. 214—85)

My invention relates to improvements in freight carrying vehicles such as railroad cars, trucks and airplanes having detachable freight carrying bodies or loading units.

An important object of my invention is to provide a one-man operated freight carrying device of such construction that one man, unassisted by anyone else or by any special machinery at the transfer points, can load and unload one or more interchangeable freight carrying units.

Another important object of the invention is to provide a compact and simplified mechanism which functions to hold the freight carrying body locked in place on the vehicle during transport and, when unlocked functions as the take-off ramp.

A further object of my invention is to provide means which employs a minimum of parts for moving the freight carrying body on and off the vehicle, and which requires a minimum of labor.

A further object of my invention is to provide an interchangeable freight carrying device which permits each unit to be loaded or unloaded without particular care on the driver's part in aligning the vehicle with a freight receiving platform and which requires no crane or auxiliary unloading apparatus of any sort on the platform.

Another object of my invention is to provide a particularly efficient form of locking mechanism, and one by which each unit is individually secured to the carrying vehicle in a simple and efficient manner, thereby making possible the removal of any chosen unit without disturbing the others.

Other objects and advantages of my invention will become apparent as this description proceeds.

In the accompanying drawings forming a part of this specification and in which like numerals are employed to designate like parts throughout the same, Fig. 1 is a view in perspective showing a portion of the chassis of a carrying vehicle with two detachable units thereon (shown in dotted lines);

Fig. 2 is a detail view in perspective of a portion of the locking and track run-off mechanism;

Fig. 3 is a side elevational view partly in cross-section of the lower left-hand portion of Fig. 2;

Fig. 4 is a view in vertical elevation partly in cross-section showing the relation of the parts of Fig. 3 when the freight body unit has been freed and is to be moved off the carrying vehicle to the right;

Fig. 5 is a view similar to Fig. 4 showing the relation of the parts when the freight body unit is to be moved off the carrying vehicle to the left;

Fig. 6 is a view in vertical elevation partly in cross-section of one form of power means for moving the freight body unit on or off the carrying vehicle;

Fig. 7 is a view in vertical elevation showing one of the track and lock arm units in the position of Fig. 2 and with the power applying mechanism in position as shown in Figs. 3 and 6;

Fig. 8 is a view in vertical side elevation, partly in cross-section, showing the means for mounting the power applying mechanism;

Fig. 9 is a view in cross-section taken on the line IX—IX of Fig. 4; and

Fig. 10 is a view looking in the direction of the arrows on line X—X of Fig. 6.

My invention lends itself particularly to use in the efficient handling of air freight as well as the efficient use of motor truck and trailer type vehicles, railroad cars, etc., with a minimum crew. For a long time a simple, practical, inexpensive solution has been sought to accomplish the ends of this invention, as is shown by the many patents granted on earlier devices. My invention has proven itself in practice and differs from the prior devices in its simplicity and novel combination of elements.

For example, with the device herein disclosed it is possible for a truck driver alone, and without the use of cranes, complicated power take-off mechanism, trucks, or any other extraneous source of power, to accomplish the loading or unloading from the freight carrying vehicle of one or more freight body units at any desired place, simply by means of power applied manually to a removable gear and shaft which is capable of serving anywhere on the vehicle. By means of the novel mounting mechanism, this take-off crank, shaft and gear may be mounted by the truck driver for use in loading or unloading any of the freight carrying body units from either side of the vehicle. When one unit is loaded on or unloaded, the crank, shaft and gear take-off mechanism may be moved to the next unit, so that one crank, shaft and gear does for the whole vehicle. Not only does this effect an economy in cost, but it effects a saving in materials, weight, etc. and allows more pay load.

Each track and lock arm mechanism may be quickly changed from its hold-down position to its released position or to its run-off position without the use of any tools, thereby effecting a further practical advantage over earlier devices. Since there are no tools or special devices needed for any part of the unloading or loading operation, the truck driver can never find himself stymied and unable to load or unload.

In the phantom view shown in Fig. 1 the freight containing body units 10 and 10 are shown in dotted lines in order not to obscure the under portions. Furthermore, whether these freight containing body units are made in the form of a box or as a stake body or as a tank, or in a shape and construction to contain any other form of transportable merchandise does not vary the principle and application of my invention. I use the box type merely for illustration.

Referring again to Fig. 1, the frame members 12 and 13 may represent a portion of a motor truck chassis or the chassis of a carrier type airplane, or of a railroad car. My invention is readily adaptable to each and all of these types of carrying vehicles, as well as to others, because its simplicity and completeness within itself make it possible to transfer one or more body units from one carrying vehicle to another or to factory platforms in remote places, since it does not require any crane or special auxiliary apparatus to load and unload the freight containing body units 10.

Mounted crosswise of the longitudinal frame members 12 and 13 are a plurality of cross-beams 14, 15, 16 and 17. There may be more on a particular vehicle, depending upon its length. As shown in Fig. 1, two cross-beams are indicated beneath each freight containing body unit. I prefer this construction, although in certain cases one cross-beam may be adequate, whereas in others three cross-beams or more might be required. Such changes and modifications would be within the invention contemplated depending upon the particular conditions encountered.

These cross-beams are securely fastened and braced at 18 to the carrying vehicle frame members 12 and 13 and unless the vehicle is being torn down for scrap, remain secured thereto for its useful life. Cross-beams 14, 15, 16, 17, etc., and their related parts may be of uniform and standardized construction, therefore, I shall proceed now to describe one such unit as shown in Figs. 2 to 8.

I have found that a cross beam 14 of I cross-sectional shape lends itself well to the purposes of my invention. The upper surface 20 provides a smooth face over which the freight containing body unit may slide with a minimum of friction. This face 20 is cut back or recessed at 21 to provide the narrower projecting surfaces 22 in the same plane as surface 20. These recesses are adapted to receive the two members 23 forming a yoke on the end of each track and lock arm 24. The members 23 may be pivoted to the cross-beam 14 at 25 by means of a suitable pin 26. Preferably, the overall width of the yoke 23 on each arm 24 does not exceed the width of the plane surface 20. By means of the pivotal mounting of arms 24, each may be moved in an arc about pivot pin 26 from the vertical locking position shown in Figs. 2 and 3 to either of the unloading positions shown in Figs. 4 and 5. When in the position shown in Fig. 5, the upper surface of arm 24 preferably is in substantial alignment with the plane surface 20 of cross-beam 14 so as to provide a smooth transfer point as the freight containing body unit 10 slides from one to the other.

The track and lock arm 24 performs several functions: First, when in the locked position shown in Figs. 2 and 3, it secures the freight containing body unit against lateral shifting; second, when in the position just named and with the body-lock cam-member 40 engaged, it secures the freight containing body unit 10 against any possible vertical movement; third, when in the position shown in Fig. 4, the track and lock arm 24 secures the freight containing body unit 10 against accidentally slipping off the side of the truck opposite to that from which it is intended to be removed; fourth, when the track and lock arm 24 is in the position of Fig. 5, it functions as a continuation of cross-beam 14 to provide a smooth surface over which the freight containing body unit may slide onto a freight transfer platform or to another vehicle.

The track and lock arm 24 accomplishes its first-named function, namely, to prevent lateral shifting, because it is secured at pivot point 26 to cross-beam 14 and it is secured to the freight containing body unit 10 by means of latch 30 mounted in housing 31 and released by means of lever 32. Any suitable form of latch means may be used in lieu of the type illustrated at 30. To assist in holding arm 24 in position, guide plates 33 may be secured to the side of the freight containing body unit 10 so that they engage the sides of arm 24.

To enable arm 24 to perform its second function, namely, to secure the freight containing body unit 10 against any vertical movement, there is pivotally secured to the side of arm 24 a locking means, comprising cam locking member 40 actuated by pin 41 which slides in hole 42 in extension 43 integral with cam 40. The latter engages in a suitably shaped recess 45 in the body locking member 46 which is suitably secured to the underside of the freight containing body unit 10. When cam 40 is in the position shown in Figs. 2, 3, 7 and 8, body locking member 46 and its attached freight containing body unit 10 are securely held down on the plane surface 20 of the cross-members such as 14, 15, etc., because cam 40 is mounted in arm 24 which is pivotally secured at 25 to cross-arm 14—giving a vise-like action. When cam 40 is rotated by means of sliding pin 41 into the position shown in Fig. 4, body locking member 46 is released. There are four such locks on each freight containing body unit 10 and all must be released before it can be slid on crossbeam 14 to unload it.

Track and lock arm 24 performs its third function mentioned above, namely, of preventing the unintentional movement of the freight containing body unit off the wrong side of the truck, by means of the depending supporting arm 50 pivotally secured at 51 to a boss 52 in arm 24. This function of arm 24 to limit movement of the freight containing body unit 10 is also important in the loading of body unit 10 onto the truck because it prevents body 10 from sliding off the other side of the truck. The approximate position of arm 24 when accomplishing this function is shown on the left-hand end of cross-members 16 and 17 in Fig. 1, as well as in Fig. 4. Arms 24 retain this outwardly sloping position because of gravity and because depending support arm 50 engages the end of shaft support slidable member 60.

The fourth function of track and lock arm 24, namely, its use as the surface over which the freight containing body unit slides from cross-member 14 to a loading platform or other vehicle is accomplished by swinging arm 24 into position as shown in Fig. 5 and at the right in Fig. 1. To move it into this position from the position shown in Fig. 3, depending support arm 50 is moved to the left to guide it over shaft support member 60 so that it falls freely into the position shown in Fig. 5. To move arm 24 into the position shown in Fig. 5 also requires releasing latch 30 (see Fig. 2) and releasing cam 40 as shown in Fig. 4. Tip 47 of body locking member 46 is of a height to clear the bottom of cam 40 as the latter swings in an arc about the pivot point 25 with arm 24.

Referring now to Fig. 1, it will be seen that the track and lock members 24 secured to the right-hand ends of cross-beams 16 and 17 are in the position illustrated in Fig. 5 and just described.

It is thus clear that the operation of each lock arm 24 is handled separately and readily by the truck operator without any assistance from anyone else or from any machinery or special tools. Assuming that the operator has placed the arms 24 in the position shown on the ends of cross-members 16 and 17 in Fig. 1, it is clear that it is his intention to move the freight containing unit 10 to the right off the carrying vehicle onto the factory platform 100 or another vehicle. Here again it is desirable that he should be able to accomplish this by himself without any complicated power take-off mechanism connected to the propelling unit of the carrying vehicle and without any apparatus at the unloading point.

To accomplish this result with a minimum of parts and with as little weight as possible, particularly where air freight is involved, I provide a shaft support slidable member 60 at the end of each cross-arm 14, 15, 16, 17, etc. These members 60 on the ends of each adjacent pair of cross-members, e. g., 16 and 17, are used to support against downward vertical movement a shaft 61 and pinion gear 62. Shaft 61 is dropped into U-shaped slot 63 when shaft support slidable member 60 is in its extended position as shown in Fig. 8. The end of each cross-member 14 is suitably recessed with a semi-circle 64, the lower fourth of which is adapted to lie in substantially the same plane as the corresponding portion of the bottom of recess 63 when member 60 is retracted and held in the position shown in Figs. 1 to 5. The upper half of recess 64 functions to lock and retain shaft 61 against upward vertical movement out of slot 63. Member 60 is in turn retained in its retracted position on cross-member 14 by means of locking pawl 65 pivoted at 66 and engaging in notch 67. Slidability to member 60 is permitted by means of a horizontal slot 68 in each end of member 14, through which passes tie-rod 69 secured in member 60. When shaft 61 is in the position shown in Figs. 1, 3, 5 and 6, pinion gear 62 is in engagement with rack 70 secured to the bottom of freight containing body unit 10.

Looking now to the right-hand corner of Fig. 1, we see that the truck operator, by rotating the handle 71 on shaft 61, will impart movement to pinion gear 62 and in turn cause freight containing body unit 10 to slide on surface 20 of cross-members 16 and 17. Shaft 61 and gear 62 are mounted with relation to arm pivot point 25 so that as the freight containing body unit 10 transfers its weight from cross-members 16 and 17 to the two arms 24, rack 70 will remain in engagement with the teeth of pinion 62, thus enabling the truck operator to retain control of body unit 10 and move it along arms 24 and onto freight platform 100.

To assist in the movement of body unit 10 on the latter, I have found it desirable to provide on the bottom of each body unit a pair of rollers 80 which, in cooperation with the skid shoes 81, at each corner of body unit 10, permit ready movement of the latter over the surface of a platform or through a factory.

As shown in Fig. 10, I prefer to bell out or widen the mouth of the recess 90 on the bottom of each body unit 10 so as to facilitate its ready entry onto the arms 24 and thus not require perfect alignment when the loading operation is beginning. Fig. 9 shows how the body unit cross-member 91 straddles cross-member 14.

While I have shown the preferred construction which answers the requirements very effectively, I do not desire to be confined to the precise details either of construction, or arrangement, or mode of application, but aim in my claims to cover all modifications which do not involve a departure from the spirit and scope of the invention as set forth in the appended claims.

What I claim is:

1. In a detachable unit freight carrying vehicle, the combination of a freight containing body unit, a freight carrying vehicle frame, a platform carried thereby, said platform having pivoted on its edges track and lock arms, said body unit having a plurality of said track and lock arm members arranged to extend vertically alongside said body, means extending laterally outward from the under side of said body adjacent the hinged end of each arm, and means carried on each arm near its hinged end to engage said extensions and lock said body against movement vertically off said platform.

2. In a detachable unit freight carrying vehicle adapted to carry one or more removable freight containing body units of the type having a rack on its bottom, the combination of a supporting platform secured to said vehicle, track and lock arms pivotally secured to each edge of said platform; said platform also having near its edges means for mounting a shaft and pinion gear at substantially right angles to said rack and means on the said arms when in lowered position for locking said shaft and gear in operative relation to said rack.

3. In a detachable unit freight carrying vehicle having one or more freight containing body units adapted to be individually secured to the freight carrying vehicle, the combination of a plurality of cross-members secured to said vehicle to support said detachable body units, each cross-member having at its outermost ends pivoted lock and track arms, each of said arms being provided with locking means to engage cooperating projections on the side of said body units, said locking means on each arm including a cam member adapted to engage said body unit.

4. In a detachable unit freight carrying vehicle having one or more freight containing body units adapted to be individually secured to the freight carrying vehicle, the combination of a platform secured to said vehicle to support said detachable body units, each platform having at its outermost ends pivoted lock and track arms, each arm having a cam adjacent its pivoted end, and a cooperating cam face on each body unit which parts when in engagement secure said body unit to said platform.

5. In a detachable unit freight carrying vehicle having one or more freight containing body units adapted to be individually secured to the freight carrying vehicle and moved on and off by means of a rack thereon, the combination of a platform secured to said vehicle to support said detachable body units, said platform having at its outermost ends pivoted lock and track arms, slidable means mounted on the edges of said platform with half bearings to receive a shaft, and means on said arms which when lowered lock said slidable means in position and said shaft in said bearings.

6. In a detachable unit freight carrying vehicle the combination of a detachable freight unit a freight carrying vehicle frame, a platform carried thereby, said platform having pivoted near its edges track and lock arms, means for moving said arms through an arc of at least 90°, extensions on said freight unit extending alongside said arms when the latter are lifted into their vertical position, and rotatable cam means on said arms which can then be turned to engage said extensions to lock said freight unit to said platform.

7. In a detachable unit freight carrying vehicle having one or more freight containing body units adapted to be individually secured to the freight carrying vehicle, the combination of a platform secured to said vehicle to support said detachable body units, said platform having at its outermost edges pivoted lock and track arms, each of said arms being provided with locking means to engage cooperating projections on the side of said body units, said locking means on each arm including a cam member adapted to engage said body unit.

8. In a detachable unit freight carrying vehicle the combination of a detachable freight unit, a freight carrying vehicle frame, a platform carried thereby, said platform having pivoted near its edges track and lock arms, means for moving said arms through an arc of at least 90°, extensions on said freight unit extending alongside said arms when the latter are lifted into their vertical positions, and rotatable cam means on said arms which can then be turned to engage said extensions to lock said freight unit to said platform, the means for rotating said cam including a movable element which locks said cam against rotation, when said element is released.

9. In a detachable unit freight carrying vehicle the combination of a freight carrying vehicle frame, detachable freight units, platform means adapted to support said units, said platform means having pivoted near its edges and near the positions each of said units will occupy, track and lock arms, extensions on said freight unit extending alongside said arms when the latter are lifted into their vertical position, and rotatable cam means on said arms which can then be turned to engage said extensions to lock said freight unit to said platform.

HAROLD R. JARVIS.